United States Patent [19]

Ushio et al.

[11] Patent Number: 4,936,270
[45] Date of Patent: Jun. 26, 1990

[54] COMPOSITE LIGHT ALLOY MEMBER

[75] Inventors: Hideaki Ushio; Tadayoshi Hayashi, both of Saitama, Japan

[73] Assignee: Honda Giken Kogyo Kabushiki Kaisha, Tokyo, Japan

[21] Appl. No.: 207,184

[22] Filed: Jun. 15, 1988

[30] Foreign Application Priority Data

Jun. 15, 1987 [JP] Japan ................................ 62-148773
Jan. 20, 1988 [JP] Japan ................................ 63-5564[U]

[51] Int. Cl.$^5$ ............................................. F01L 1/18
[52] U.S. Cl. ............................ 123/193 C; 123/90.39; 123/90.51; 123/188 S
[58] Field of Search ............... 123/90.39, 90.51, 188 S, 123/193 C

[56] References Cited

U.S. PATENT DOCUMENTS

| | | | |
|---|---|---|---|
| 4,485,770 | 12/1984 | Saka et al. ........................ | 123/90.51 |
| 4,583,502 | 3/1986 | Takahashi et al. ................ | 123/90.51 |
| 4,598,675 | 7/1986 | Long ................................ | 123/90.51 |
| 4,614,172 | 9/1986 | Hayashi et al. ................... | 123/188 S |
| 4,632,074 | 12/1986 | Takahashi et al. ................ | 123/90.51 |
| 4,723,518 | 2/1980 | Kawasaki et al. ................ | 123/188 S |
| 4,817,578 | 3/1989 | Ushio et al. ...................... | 123/193 C |

Primary Examiner—E. Rollins Cross
Attorney, Agent, or Firm—Lyon & Lyon

[57] ABSTRACT

In a composite light alloy member in which a reinforcing portion is bonded or joined to a member body is formed of a reinforcing material and a light alloy matrix filled in said reinforcing material, the reinforcing material is a heat resistant continuous-pore type element having a porosity of 90% or less and an average diameter of pores of 100 μm or less. The reinforcing material may be a metal or ceramic sinter that is preformed and cast into the composite light alloy member.

22 Claims, 8 Drawing Sheets

COMPOSITE LIGHT ALLOY MEMBER

The present invention relates to a composite light alloy member and more particularly, to such a member in which a part requiring high temperature strength, wear resistance and the like is formed by a reinforcing portion comprising a reinforcing material and a light alloy matrix filled in the reinforcing material, the reinforcing portion being bonded or joined to a member body.

There is a conventionally known composite light alloy member of this type in which a portion of a high density ceramic sinter as a reinforcing material is incorporated in a member body when the latter is cast (see Japanese Utility Model Application Laid-Open No. 16302/83).

However, the above light alloy member is lacking in reliability in that the bond strength between the ceramic sinter and the member body is low and hence, there is a fear of separation of the ceramic sinter from the member body due to a difference in thermal expansion coefficient between the ceramic and the light alloy.

It is an object of the invention to provide a composite light-alloy member of the type described above in which the bond strength between the member body and the reinforcing portion is improved.

It is another object of the present invention to provide a composite light alloy member of the type described above in which the high temperature strength and the wear and seizure resistances are improved.

To accomplish the above objects, according to the present invention, there is provided a composite light alloy member in which a reinforcing portion bonded or joined to a member body is formed by a reinforcing material and a light alloy matrix is filled in the reinforcing material, the reinforcing material being a heat resistant continuous pore type porous element having a porosity of 90% or less and an average diameter of pores of 100 $\mu$m or less.

In addition, according to the present invention, there is provided a composite light alloy member wherein the pores include those having an average diameter of 50 $\mu$m or more in a proportion of 5 to 40%.

Further, according to the present invention, there is provided a composite light alloy member wherein the pores, excluding an opening on the side of an action surface of the reinforcing portion, are filled up with the light alloy matrix.

Yet further, according to the present invention, there is provided a composite light alloy member wherein the porous element is a metal sinter or a ceramic sinter.

Still further, according to the present invention, there is provided a composite light alloy member wherein the reinforcing material is a heat resistant continuous-pore type porous element filled with a molten metal of light alloy and bonded or joined to the member body when the latter is cast, and the porosity of the porous element in a junction surface defining region is set in a range of 30 to 90% and the average diameter of the pores in this region is in a range of 10 to 100 $\mu$m, while the porosity of the porous element in an actin surface defining region is set in a range of 8 to 40% and the average diameter of the pores in this region is in a range of 0.1 to 10 $\mu$m.

With the above construction, the portion requiring a high temperature strength can be formed of the reinforcing portion comprising the heat resistant porous element and the light alloy matrix filled in the porous element and hence, the durability of such portion can be improved.

In bonding or joining the reinforcing portion to the member body, a method can be employed for welding the light alloy matrix to the member body by utilizing the compatibility of the alloys of the same type, when a molten metal is filled into the porous element during casting of the member body, or when the reinforcing portion having the porous element filled with the light alloy matrix is placed onto a mold to cast the member body. This makes it possible to firmly bond the reinforcing portion to the member body.

Further, compounding of the light alloy and the porous element is performed in the reinforcing portion and allows moderation of the difference in thermal expansion coefficient between the reinforcing portion and the member body. This precludes the possibility of separation of the reinforcing portion from the member body, leading to an improved reliability.

However, if the porosity of the porous element is more than 90%, the strength of the porous element is reduced to cause deformation, breaking and the like of the porous element when the light alloy matrix is filled thereunto.

On the other hand, if the average diameter of the pores exceeds 10 $\mu$m, transferring of a stress between the light alloy matrix filled in the pores and the porous element is lowered, resulting in a reduced strength of the reinforcing portion.

Inclusion of the pores having a larger average diameter in all the pores of the porous element as described above makes it possible to improve the fillability of a molten metal.

Further, the wear and seizure resistances of the light alloy member can be improved by allowing the voids provided in the pores and opened in the action surface of the reinforcing portion to function as oil reservoirs.

Yet further, the wear resistance of the reinforcing portion on the side of its action surface can be improved and the bond strength in the junction surface can be improved by varying the porosity of the porous element on the sides of the action and junction surfaces as described above.

The above and other objects, features and advantages of the invention will become apparent from reading of the following detailed description of the preferred embodiments, taken in conjunction with the accompanying drawings, wherein:

Figure 1:
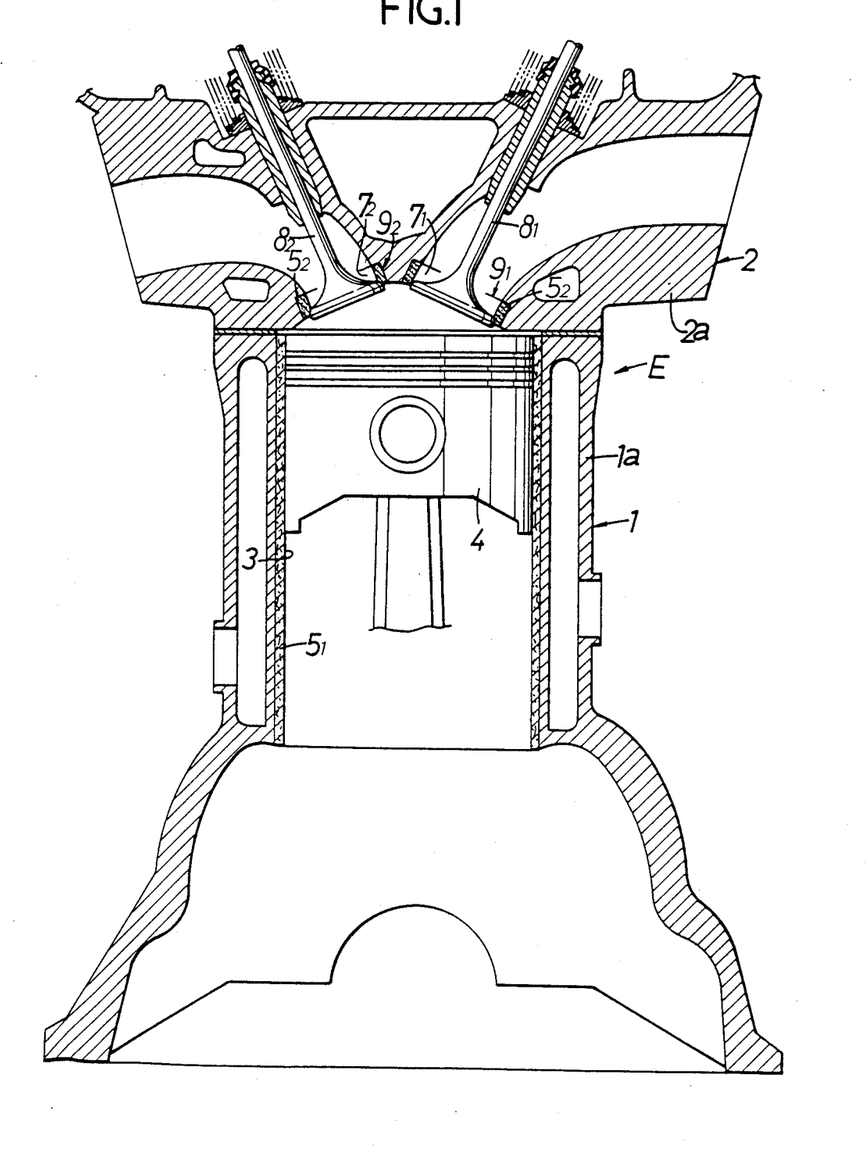
FIG. 1 is a front view in lateral section of one cylinder of an internal combustion engine.

FIG. 1 illustrates an internal combustion engine E which comprises a cylinder block 1, a cylinder head 2 mounted on the cylinder block 1, and a piston 4 slidably fitted in a cylinder bore 3 in the cylinder block 1.

Figure 2:
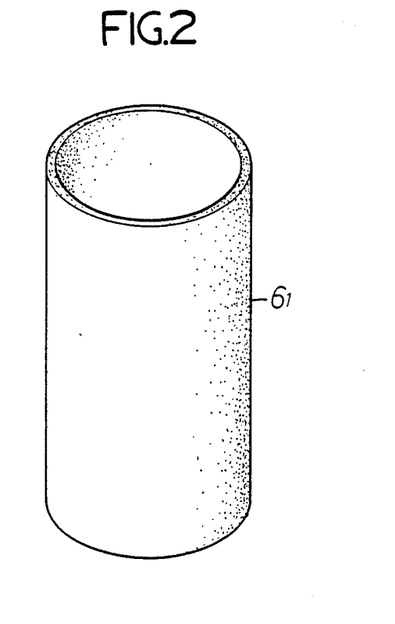
FIG. 2 is a perspective view of a porous element for a cylinder block.

The cylinder block 1 is comprised of a cylinder block body 1a made of a light alloy, and a cylindrical reinforcing portion $5_1$ defining the cylinder bore 3 and, therefore, the reinforcing portion $5_1$ corresponds to an inner wall of the cylinder bore. The reinforcing portion $5_1$ is comprised of a heat-resistant continuous-pore type cylindrical porous element $6_1$, and a light alloy matrix filled in the porous element $6_1$ in casting of the cylinder block 1a. Therefore, the cylinder block 1 corresponds to a composite light alloy member, while the cylinder block body 1a corresponds to a member body.

With the above construction, it is possible to enhance the high-temperature strength of the inner cylinder bore wall subjected to a sliding action of the piston 4 at a high temperature, thereby improving the durability thereof.

In addition, the reinforcing portion $5_1$ can be firmly bonded or joined to the cylinder block body 1a. Moreover, such bonding is performed during the casting of the cylinder block body 1a and hence, the bonding workability is satisfactory. Further, because such bonding is done by simply filling the porous element $6_1$ with a molten metal of light alloy, the variation in bond strength will be minimized. Accordingly, it is possible to stabilize and improve the bond quality.

Furthermore, compounding of the porous element $6_1$ and the light alloy is performed in the reinforcing portion $5_1$ and allows moderation of the difference in thermal expansion coefficient between the reinforcing portion $5_1$ and the cylinder block body 1a. Therefore, the reinforcing portion $5_1$ will not separate from the cylinder block body 1a and thus, it is possible to improve the reliability.

Figure 3:
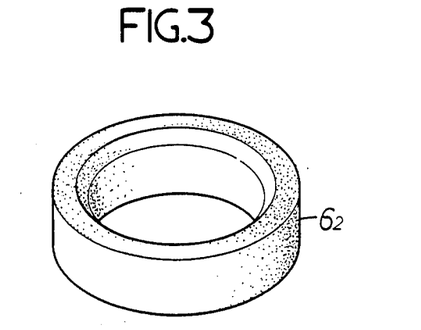
FIG. 3 is a perspective view of a porous element for a cylinder head.

The cylinder head 2 is comprised of a cylinder head body 2a of a light alloy, and annular reinforcing portions $5_2$ and $5_2$ defining intake and discharge ports $7_1$ and $7_2$. Therefore, the two reinforcing portions $5_2$ and $5_2$ correspond to valve seats $9_1$ and $9_2$ for intake and discharge valves $8_1$ and $8_2$. The reinforcing portion $5_2$ comprises a heat resistant continuous-pore type porous element $6_2$ as a reinforcing material, and a light alloy matrix filled in the porous element $6_2$ in casting of the cylinder head body 1a. Therefore, the cylinder head 2 corresponds to a composite light alloy member, while the cylinder head body 2a corresponds to a member body.

With the above construction, it is possible to enhance the high-temperature strength of the valve seats $9_1$ and $9_2$ subjected to impact action of the intake and discharge valves $8_1$ and $8_2$ at a high temperature, thereby improving the durability thereof.

In addition, the reinforcing portions $5_2$ and $5_2$ can be firmly bonded or joined to the cylinder head body 2a. Moreover, such bonding is performed during casting of the cylinder head body 2a and hence, the bonding workability is satisfactory. Further, because such bonding is done by simply filling the porous element $6_2$ with a molten metal of light alloy, the variation in bond strength will be minimized. Accordingly, it is possible to stabilize and improve the bond quality.

Furthermore, compounding of the porous elements $6_2$ and the light alloy is performed in the reinforcing portions $5_2$ and allow moderation of the difference in thermal expansion coefficient between the reinforcing portions $5_2$ and the cylinder head body 2a. Therefore, the reinforcing portions $5_2$ will not separate from the cylinder head body 2a and thus, it is possible to improve the reliability.

The light alloys which may be employed include aluminum alloys, magnesium alloys and the like.

The porous elements $6_1$, $6_2$ is a metal or ceramic sinter and preferably has a compression strength ($P_2$%) of 1 kg/cm$^2$ or more. A powder of starting material for the metal sinter may be one selected from the group of powders of Fe, Cu, Ni, and Fe-based, Cu-based and Ni-based alloys. Examples of the Fe-based alloys are a Cu-C-MoFe based alloy (corresponding to SAE86 material) and a particle-dispersed type Cr-Co-WFe based alloy having a good wear resistance. A powder of starting material for the ceramic sinter may be one selected from the group of powders of SiC, Si$_3$N$_4$, Al$_2$O$_3$, Al$_2$O$_3$-SiO$_2$-based and ZrO$_2$, and cordierite powders.

In producing the ceramic sinter, there is used a technique comprising producing a molding using a mixture of the above-described ceramic powder and a vitreous powder elutable with an acid, subjecting the molding to a primary sintering treatment at a lower temperature to provide an intermediate product, eluting the vitreous powder in the intermediate product with an acid to provide a large number of continuous pores in the intermediate product, and subjecting the intermediate product to a secondary sintering treatment at a higher temperature. An alternative technique can be used which comprises producing a molding using a ceramic powder of a coarse particle size and then subjecting the molding to a sintering treatment.

The porosity of the porous elements $6_1$, $6_2$ may be set at 90% or less, e.g., in a range of 10% (inclusive) to 90% (inclusive). If the porosity is less than 10%, the filling of a light alloy matrix thereinto will be degraded even under a light alloy matrix filling pressure of 300 kg/cm$^2$, resulting in a reduced strength of the resultant reinforcing portions $5_1$ and $5_2$ themselves and also in a reduced bond strength of the reinforcing portions $5_1$ and $5_2$ with the cylinder block body 1a and the cylinder head body 2a. On the other hand, if the porosity exceeds 90%, the reinforcing elements $6_1$ and $6_2$ will have a reduced strength and thus, may be deformed or broken during filling of a light alloy matrix thereinto.

The porosity of the porous elements $6_1$ and $6_2$ is preferably in a range of 15% (inclusive) to 50% (inclusive), and setting of the porosity in such range allows a fillability of 60% or more even under a lower light alloy-filling pressure such as 10 kg/cm², leading to an economical advantage that the filling pressure required to provide a fillability of 100% may be lower.

The average diameter of pores in the porous element $6_1$, $6_2$ may be set at 100 μm or less, e.g, in a range of 0.5 (inclusive) to 100 μm (inclusive). If the average diameter is less than 0.5 μm, the filling of a light alloy matrix thereinto will be degraded even under a light alloy-filling pressure of 450 kg/cm² and a preheating temperature of the porous elements $6_1$ and $6_2$ of 700° C., resulting in a reduced strength of the resultant reinforcing portions $5_1$ and $5_2$ themselves and also in a reduced bond strength of the reinforcing portions $5_1$ and $5_2$ with the cylinder block body 1a and cylinder head body 2a, respectively, or the like as in the above-described case. On the other hand, if the average diameter exceeds 100 μm, transferring of a stress between a light alloy matrix filled in the pores and the porous elements $6_1$ and $6_2$ will be lowered, and the resultant reinforcing portions $5_1$ and $5_2$ will have a reduced strength.

The average diameter of the pores in the porous elements $6_1$, $6_2$ is preferably in a range of 0.7 (inclusive) to 60 μm (inclusive), and setting of the average diameter in such range enables a satisfactory light alloy-filling property to be provided under a normal economical conditions of a light alloy-filling pressure of 300 kg/cm² and preheating temperature of the porous element $6_1$, $6_2$ of 400° C .

In this case, it is preferred that the pores contain those having an average diameter of 50 μm or more in a proportion of 5 to 40%. If the porous element contains the pores of such a large average diameter in a particular amount as described above, the filling of a molten metal into the whole porous element $6_1$, $6_2$ can be improved, because the molten metal is preferentially filled into these pores.

Figure 4:
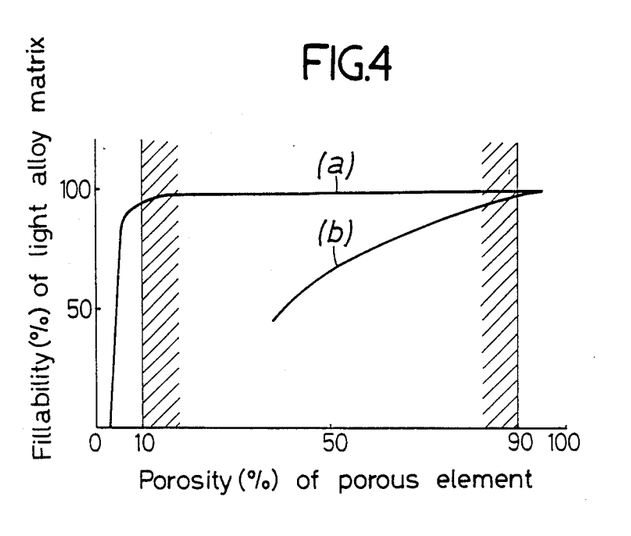
FIG. 4 is a graph illustrating a relationship between the porosity of the porous element and the fillability of a light alloy matrix.

FIG. 4 illustrates a relationship between the porosity of the porous element and the fillability of a light alloy matrix. In this case, the porous element used is a ceramic sinter produced from a ceramic powder of $Si_3N_4$, and has an average diameter of 1 μm. In addition, the light alloy matrix used is an aluminum alloy defined in JIS AC2B. A casting operation is carried out by placing the porous element preheated to 400° C. into a mold and pouring a molten metal of aluminum alloy into the mold to apply a predetermined filling pressure thereto.

A line (a) in FIG. 4 corresponds to such relationship wherein the filling pressure is set at 300 kg/cm², and a line (b) in FIG. 4 corresponds to such relationship wherein the filling pressure is set at 10 kg/cm².

As apparent from the line (a) in FIG. 4, setting of the porosity of the porous element at 10% or more makes it possible to provide a higher fillability under 300 kg/cm² which is an economical filling pressure. In addition, setting of the porosity of the porous element at a higher level makes it possible to provide a higher fillability even under a lower filing pressure of the aluminum alloy.

Figure 5:
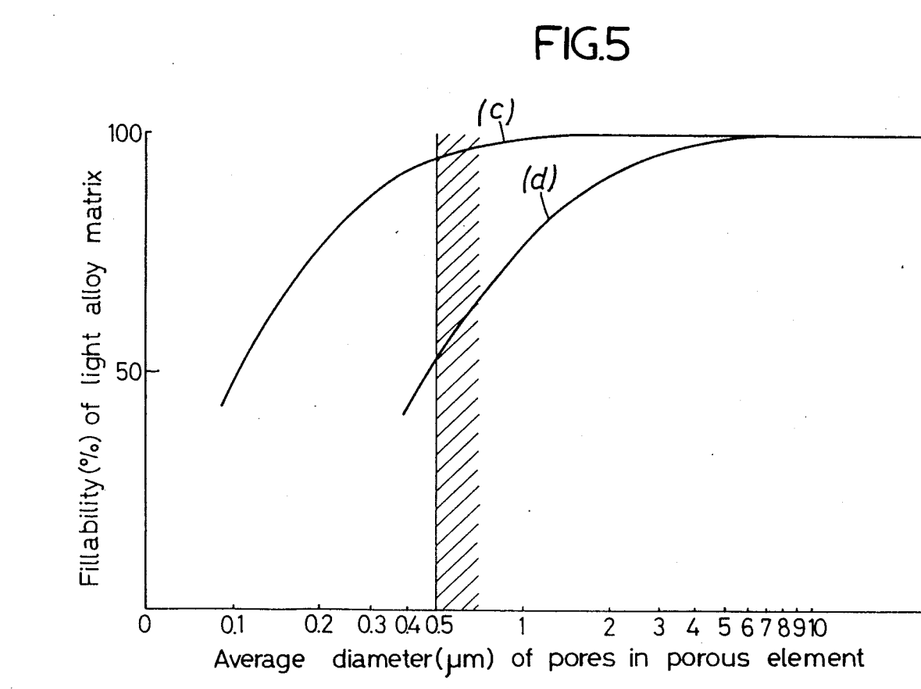
FIG. 5 is a graph illustrating a relationship between the average diameter of pores in the porous element and the fillability of the light alloy matrix.

FIG. 5 illustrates a relationship between the average diameter of pores in a porous element and the fillability of a light alloy matrix. The porous element (ceramic sinter) and light alloy matrix used are similar to those described above, but the porosity of the porous element is set at 50%.

In FIG. 5, a line (c) corresponds to such relationship wherein the preheating temperature of the porous element is set at 700° C. and the filling pressure during casting is at 450 kg/cm², and a line (d) corresponds to such relationship wherein the preheating temperature of the porous element is set at 400° C. and the filling pressure during casting is at 300 kg/cm².

In the line (c) in FIG. 5, setting of the average diameter of the pores at 0.5 μm or more provides a higher fillability. With the line (d), the average diameter of the pores is preferred to be of 3 μm or more.

The following Table shows the strength of the reinforcing portion. In the reinforcing portion of the present invention, an iron-based sinter derived from a powder of an iron-based alloy comprising Cu-C-Mo-Fe is used for the porous element. A material for the light alloy matrix is the same as described above. However, the porosity of the porous element is of 24%, and the average diameter of pores is of 15 μm.

Comparative Example I is a reinforcing portion comprising an aluminum-based fiber molded product having a fibre volume fraction of 30% and the above-described light alloy matrix filled in the fiber molded product, while Comparative Example II is a reinforcing portion formed of the above-described light alloy alone.

| | Tensile Strength (kg/mm²) | | |
|---|---|---|---|
| | Room Temperature | 300° C. | 400° C. |
| Present Invention | 25 | 24 | 20 |
| Comparative Example I | 32 | 13 | 6 |
| Comparative Example II | 29 | 11 | 3.5 |

As apparent from the above Table, the reinforcing portion comprising the porous element of this invention and the light alloy matrix has an excellent strength in both lower and higher temperature regions.

In Comparative Example I, the durability of the reinforcing portion comprising the light alloy matrix and the alumina-based fiber is reduced substantially, because the strength of the light alloy matrix tends to decrease at an increased temperature and also because a lower strength is provided when the alumina-based fiber alone is used.

Figure 6A:
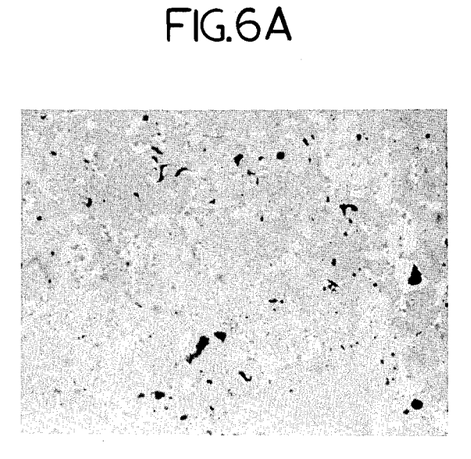
FIGS. 6A and 6B are microphotographes showing the metallographic structure of a reinforcing portion when a metal sinter is used as the porous element, FIG. 6A being such microphotograph when a metal sinter having a porosity of 24% and an average pore diameter of 15 $\mu$m is used, and FIG. 6B being such microphotograph when a metal sinter having a porosity of 35% and an average pore diameter of 15 $\mu$m is used.
Figure 6B:
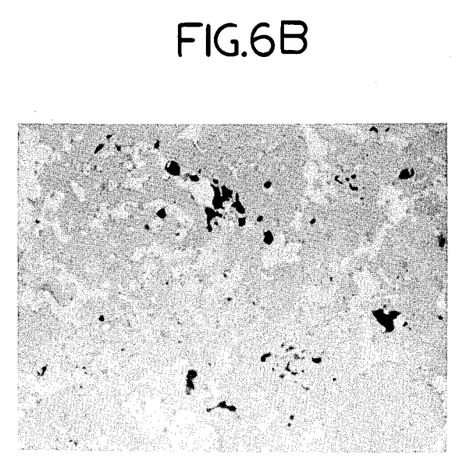

FIGS. 6A and 6B are microphotographes (400 times) showing metallographical structures of the reinforcing portions produced respectively by use of the above-described JIS AC2B as the light alloy matrix and by use, as the porous element, of an iron-based sinter produced from a powder of an iron-based alloy of Cu-C-Mo-Fe.

FIGS. 6A corresponds to the microphotograph in the case where the porosity of the porous element is of 24%; the average diameter of pores is of 15 μm; the preheating temperature during casting is of 400° C.; and the filling pressure is of 450 kg/cm².

FIG. 6B corresponds to the microphotograph in the case where the porosity of the porous element is of 35%; the average diameter of pores is of 15 μm; the preheating temperature during casting is of 400° C.; and the filling pressure is of 300 kg/cm².

In FIGS. 6A and 6B, a deep gray portion is the porous element; a light gray portion is the light alloy matrix, and a black portion is one of the pores.

Figure 7A:
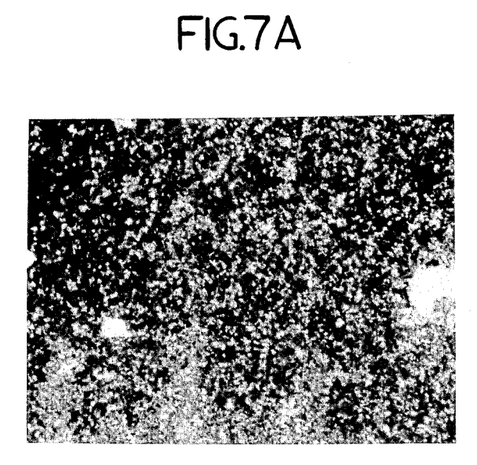
FIGS. 7A and 7B are microphotographes showing the structure of the reinforcing portion when a ceramic sinter is used as the porous element, FIG. 7A being such microphotograph when a ceramic sinter having a porosity of 50% and an average pore diameter of 1 μm is used, and FIG. 7B being such microphotograph when a ceramic sinter having a porosity of 65% and an average pore diameter of 1 μm is used.
Figure 7B:
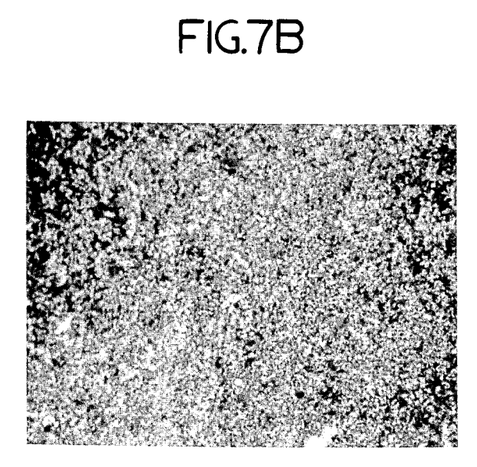

FIGS. 7A and 7B are microphotographes (400 times) showing structures of composite portions produced respectively by use, as the porous element, of a ceramic sinter derived from a ceramic powder of $Si_3N_4$ and by use of the above-described JIS AC2B as the light alloy matrix.

FIG. 7A corresponds to the microphotograph in the case where the porosity of the porous element is of 50%; the average diameter of pores is of 1 μm; the preheating temperature during casting is of 700° C.; and the filling pressure is of 450 kg/cm².

FIG. 7B corresponds to the microphotograph in the case where the porosity of the porous element is of 65%; the average diameter of pores is of 1 μm; the preheating temperature during casting is of 700° C.; and the filling pressure is of 450 kg/cm².

In FIGS. 7A and 7B, a deep gray portion is the porous element; a light gray portion is the light alloy matrix, and a black portion is one of the pores.

It is apparent from FIGS. 6A, 6B, 7A and 7B that the fillability of the light alloy matrix into the porous element is excellent.

The above-described metal sinter is most suitable as a porous element for forming a valve seat for the cylinder head, wherein it is preferred that the porosity is in a range of 20 to 60%, and the average diameter of pores is in a range of 5 to 100 μm. Of course, a ceramic sinter may be used as a porous element for a valve seat.

In addition, such ceramic sinter is most suitable as a porous element for forming an inner wall of the cylinder bore in the cylinder block, because it is light in weight. In this case, it is preferred that the porosity is in a range of 50 to 90%, and the average diameter of pores is in a range of 5 to 50 μm. Of course, a metal sinter may be used as a porous element for an inner cylinder bore wall.

Alternatively, a light alloy matrix may be previously filled into porous elements $6_1$ and $6_2$ to provide reinforcing portions $5_1$ and $5_2$ which are then placed onto a mold, so that during casting of a cylinder block body $1a$ and a cylinder head body $2a$, the reinforcing portions $5_1$ and $5_2$ may be bonded or joined to the cylinder block body $1a$ and the cylinder head body $2a$. In this case, the use of the same type of materials of the light alloy matrix and the light alloy for forming the cylinder block body $1a$ and the cylinder head body $2a$ makes it possible to firmly bond the reinforcing portions $5_1$ and $5_2$ to the cylinder block body $1a$ and the cylinder head body $2a$ by utilizing the compatibility of such materials.

Alternatively, the reinforcing portion $5_1$ in the cylinder block 1 also can be formed so that except for openings on the side of their action surface, namely, the inner wall surface of the cylinder bore, the pores may be filled up with the light alloy matrix.

To form openings on the side of the action surface of the pores into voids in this manner, a technique may be used for controlling the temperature, the filling pressure and the like during casting of a cylinder block $1a$ to maintain the openings unfilled, or for removing the aluminum alloy filled in the openings by a treatment such as elution after casting.

These voids or openings function as oil reservoirs, so that the seizure and wear resistances of the action surfaces at the starting of engine can be improved.

FIGS. 8 to 12 illustrate a rocker arm 10 for an internal combustion engine as a composite light alloy member. The rocker arm 10 comprises a rocker arm body $10a$ of a light alloy as a member body, and a heat resistant continuous-pore type porous element $6_3$ made of a ceramic sinter and bonded to the rocker arm body $10a$. A molten metal of the light alloy is filled into pores 11 in the porous element $6_3$ during casting of the rocker arm body $10a$, thereby bonding the porous element $6_3$ to the rocker arm body $10a$. A reinforcing portion $5_3$ is formed of the porous element $6_3$ and the light alloy matrix and has an action surface $5a$ which serves as a slipper surface on which a cam slides.

With such construction, the reinforcing portion $5_3$ can be firmly bonded to the rocker arm body $10a$. Moreover, such bonding is performed during the casting of the rocker arm body $10a$ and hence, the bonding workability is excellent. Further, because such bonding is done simply filling the porous element $6_3$ with a molten metal of light alloy, the variation in bond strength will be minimized. Accordingly, it is possible to stabilize the bond quality.

In addition, compounding of the ceramics and the light alloy is performed in the reinforcing portions $5_3$ and allows moderation of the difference in thermal expansion coefficient between the reinforcing portions $5_3$ and the rocker arm body $10a$. Therefore, the reinforcing portions $5_3$ will not separate from the rocker arm body $10a$ and thus, it is possible to improve the reliability.

Materials similar to those described above are used as the light alloy and ceramics for the rocker arms of FIGS. 8-12.

In this case, the porosity of the porous element $6_3$ is set in a range of 8 (inclusive) to 60% (inclusive). If the porosity is less than 8%, the amount of molten metal filled will decrease as the number of pores decreases, resulting in a failure to provide a satisfactory bond strength. On the other hand, any porosity exceeding 60% will result in a reduced wear resistance. The porosity of the porous element $6_3$ is preferably in a range of 50 to 60%.

The average diameter of the pores 11 in the porous element $6_3$ is set in a range of 0.5 μm (inclusive) to 100 μm (inclusive). Any average diameter less than 0.5 μm will result in a reduced fillability of a molten metal due to its surface tension, whereas any average diameter exceeding 100 μm will result in a reduced wear resistance.

The porous element $6_3$ is produced in a procedure similar to that described above.

Figure 8:
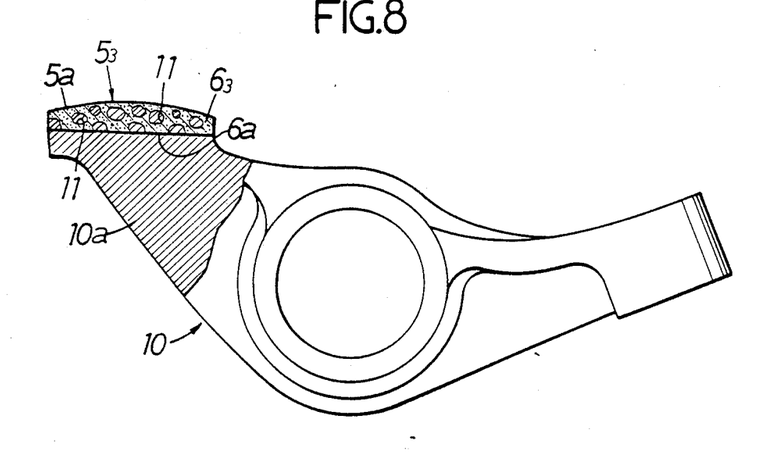
FIG. 8 is a partial sectional view of details in a first example of a rocker arm for an internal combustion engine.

FIG. 8 illustrates a first example of the rocker arm 10 in which a junction surface $6a$ of the porous element $6_3$ to the rocker arm body $10a$ is flat.

Figure 9:
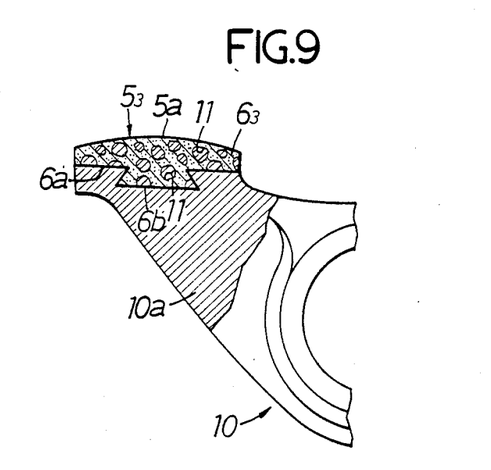
FIG. 9 is a partial sectional view of details in a second example of a portion of the rocker arm.

FIG. 9 illustrates a second example of the rocker arm 10 in which a dovetail shaped anchor portion $6b$ is added to the porous element $6_3$. If the anchor portion $6b$ is added in this manner, a mechanical force due to the cast-in-place insert is added and this makes it possible to further improve the bond strength of the reinforcing portion $5_3$ to the rocker arm body $10a$.

Figure 10:
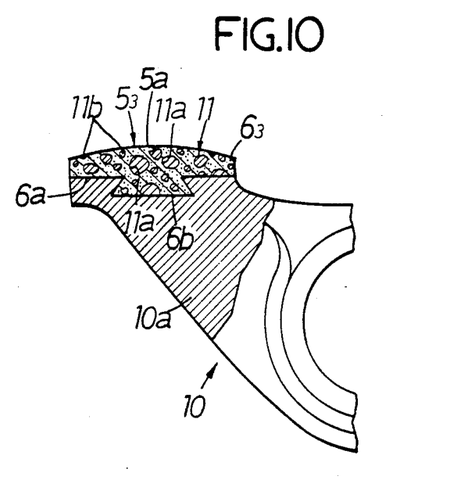
FIG. 10 is a partial sectional view of details in a third example of a portion of the rocker arm.

FIG. 10 illustrates a third example of the rocker arm 10. In the porous element $6_3$ in this rocker arm 10, the pores 11 include those $11a$ having an average diameter of 50 μm or more in a proportion of 5 to 40%. The reference character $11b$ designates a pore having an average diameter less than 50 μm. If pores $11a$ of larger average diameters are included in the pores 11 in a particular amount as described above, the fillability of a molten metal into the hole porous element $6_3$ can be improved, because the molten metal is preferentially filled into such pores $11a$.

Figure 11:
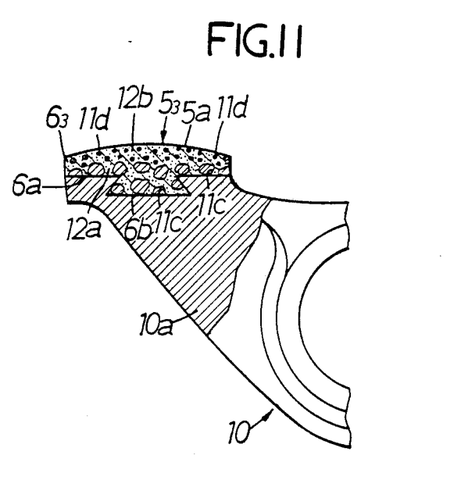
FIG. 11 is a partial sectional view of details in a fourth example of a portion of the rocker arm.

FIG. 11 illustrates a fourth example of the rocker arm 10. In the porous element $6_3$ in this rocker arm, the porosity in an area $12a$ defining a junction surface $6a$ to the rocker arm body $10a$ including an anchor portion $6b$ is set in a range of 30 to 90%, and the average diameter of pores $11c$ in such area is in a range of 10 to 100 μm. On the other hand, the porosity in an area $12b$ defining an action surface 5a is set in a range of 8 to 40%, and the average diameter of pores 11d in such area is in a range of 0.1 to 10 μm.

In the areas 12a defining the junction surface 6a, if the porosity is set in a higher range and the average diameter of the pores 11c is set in a larger range as described above, the bond strength between the reinforcing portion 5₃ and the rocker arm body 10a can be improved. On the other hand, in the area 12b defining the action surface 5a, if the porosity is set in a lower range and the average diameter of the pores 11d is set in a smaller range as described above, the wear resistance of the action surface 5a can be improved.

In this case, in the area 12a defining the junction surface 6a, any porosity less than 30% will result in a decreased effect of improving the bond strength between the reinforcing portion 5₃ and the rocker arm body 10a, whereas any porosity exceeding 90% will result in a possibility that the porous element 6₃ is damaged during filling of a molten metal since the porous element 6₃ is brittle. In addition, any average diameter of the pores 11c less than 10 μm is in danger of interference with the fillability of a molten metal, whereas any average diameter more than 100 μm will result in that the porous element 6₃ being too brittle as described above.

In the area 12b defining the action surface 5a, any porosity less than 8% will result in the above-described bond strength improving effect being decreased as the amount of molten metal filled is decreased, whereas, any porosity more than 40% will result in a decreased effect of improving the wear resistance of the action surface 5a. In addition, any average diameter of the pores 11d less than 0.1 μm will result in a substantially reduced fillability of a molten metal, whereas any average diameter more than 10 μm will result in a decreased effect of improving the wear resistance.

It should be noted that the average diameters of the pores 11c and 11d may be gradually reduced from the junction surface 6a to the rocker arm body 10a toward the action surface 5a.

Figure 12:
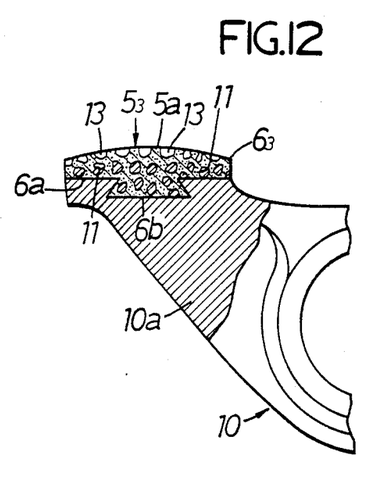
FIG. 12 is a partial sectional view of details in a fifth example of a portion of the rocker arm.

FIG. 12 illustrates a fifth example of the rocker arm 10. The porous element 6₃ in this rocker arm 10 has a large number of pores 11 which has been filled up with an aluminum alloy filled during casting of a rocker arm body 10a, except openings 13 on the side of an action surface 5a.

To form the hollow openings 13 on the side of the action surface 5a of the pores 11 into voids in this manner, a technique may be used for controlling the temperature and filling pressure of the molten metal and the like during casting of the rocker arm body 10a to maintain the opening unfilled, or for removing the aluminum alloy filled in the openings 13 by a treatment such as elution after casting.

These voids or openings 13 function as oil reservoirs, so that the seizure and wear resistance of the action surface 5a at the starting of engine can be improved.

Alternatively, for the rocker arms 10 of FIGS. 8–12, a light alloy matrix may be previously filled into a porous element 6₃ to provide a reinforcing portion 5₃ which is then placed onto a mold, so that during casting of a rocker arm body 10a, the reinforcing portion 5₃ may be bonded to the rocker arm body 10a. Also in this case, the use of the same type of materials of the light alloy matrix and the light alloy for forming the rocker arm body 10a makes it possible to firmly bond the reinforcing portion 5₃ to the rocker arm body 10a by utilizing the compatability of these materials. In addition, the porous element for the rocker arms may be formed of a metal sinter.

What is claimed:

1. A composite light alloy member in which a reinforcing portion bonded or joined to a member body is formed of a reinforcing material and a light alloy matrix filled in said reinforcing material, wherein said reinforcing material is a heat resistant continuous-pore type porous element having a porosity of 90% or less and an average diameter of pores of 100 μm or less said light alloy member being formed of the same material as said member body and being integrally formed with the member body at least at a bonded portion therebetween.

2. A composite light alloy member according to claim 1, wherein said pores include those having an average diameter of 50 μm or more in a proportion of 5 to 40%.

3. A composite light alloy member according to claim 1 or 2, wherein said porous element is a metal sinter.

4. A composite light alloy member according to claim 3, wherein a starting material powder for said metal sinter is at least one selected from the group of powders of Fe, Cu, Ni, and Fe-based, Cu-based and Ni-based alloys.

5. A composite light alloy member according to claim 4, wherein said light alloy member is a cylinder head for an internal combustion engine, with a valve seat provided by the reinforcing portion, and said metal sinter has a porosity of 20 to 60% and an average diameter of pores of 5 to 100 μm.

6. A composite light alloy member according to claim 4, wherein said light alloy member is a cylinder block for an internal combustion engine, with an inner wall of a cylinder bore being provided by the reinforcing portion, and said metal sinter has a porosity of 50 to 90% and an average diameter of pores 5 to 50 μm.

7. A composite light alloy member according to claim 6, wherein said pores, excluding openings on the side of said inner wall of the cylinder bore, are filled up with said light alloy matrix.

8. A composite light alloy member according to claim 4, wherein said light alloy member is a rocker arm for an internal combustion engine, with a slipper surface provided by an action surface of the reinforcing portion, and said metal sinter has a porosity of 8 to 60% and an average diameter of pores of 0.5 to 100 μm.

9. A composite light alloy member according to claim 8, wherein said pores, excluding openings on the side of the slipper surface, are filled with said lightly alloy matrix.

10. A composite light alloy member according to claim 1 or 2, wherein said porous element is a ceramic sinter.

11. A composite light alloy member according to claim 10, wherein a starting ceramic powder for said ceramic sinter is at least one selected from the group of powders of SiC, Si₃N₄, Al₂O₃, Al₂O₃-SiO₂ and ZRO₂, and cordierite powders.

12. A composite light alloy member according to claim 11, wherein said light alloy member is a cylinder head for an internal combustion engine, with a valve seat provided by the reinforcing portion, and said ceramic sinter has a porosity of 20 to 60% and an average diameter of pores of 5 to 100 μm.

13. A composite light alloy member according to claim 11, wherein said light alloy member is a cylinder block for an internal combustion engine, with an inner wall of a cylinder bore being provided by the reinforcing portion, and said ceramic sinter has a porosity of 50 to 90% and an average diameter of pores of 5 to 50 μm.

14. A composite light alloy member according to claim 13, wherein said pores, excluding openings on the side of said inner wall of the cylinder bore, are filled up with said lightly alloy matrix.

15. A composite light alloy member according to claim 11, wherein said light alloy member is a rocker arm for an internal combustion engine, with a slipper surface provided by an action surface of the reinforcing portion, and said ceramic sinter has a porosity of 8 to 60% and an average diameter of pores 0.5 to 100 μm.

16. A composite light alloy member according to claim 15, wherein said pores, excluding openings on the side of the slipper surface, are filled with said light alloy matrix.

17. A composite light alloy member in which a reinforcing portion bonded to a member body is formed of a reinforcing material and a light alloy matrix filled in said reinforcing material, wherein said reinforcing material is a heat resistant continuous-pore type porous element having a porosity in a range of 15 to 50% and an average diameter of pores in a range of 0.7 to 60 μm said light alloy member being formed of the same material as said member body and being integrally formed with the member body at least at a bonded portion therebetween.

18. A composite light alloy member in which a reinforcing portion bonded to a member body at a junction surface is formed of a reinforcing material and a light alloy matrix filled in said reinforcing material, wherein said reinforcing material is a heat resistant continuous-pore type porous element which is filled with a molten metal of light alloy and bonded to the member body when the latter is cast, the porosity of said porous element in its junction surface region being set in a range of 30 to 90% and the average diameter of said pores in this region being in a range of 10 to 100 μm, while the porosity of said porous element in an action surface region being set in a range of 8 to 40% and the average diameter in this action surface region being in a range of 0.1 to 10 μm said light alloy member being formed of the same material as said member body and being integrally formed with the member body at least at a bonded portion therebetween.

19. A composite light alloy member according to claim 18, wherein said porous element is a ceramic sinter.

20. A composite light alloy member according to claim 19, wherein a starting ceramic powder for said ceramic sinter is at least one selected from the group of powders of SiC, $Si_3N_4$, $Al_2O_3$, $Al_2O_3$-$SiO_2$ and $ZrO_2$, and cordierite powders.

21. A composite light alloy member according to claim 18, 19 or 20, wherein said light alloy member is a rocker arm for an internal combustion engine, with a slipper surface provided by the action surface of the reinforcing portion.

22. A composite light alloy member according to claim 21, wherein said pores, excluding an opening on the side of the slipper surface, are filled with said light alloy matrix.

* * * * *